(12) United States Patent
Ohishi et al.

(10) Patent No.: US 6,384,904 B1
(45) Date of Patent: May 7, 2002

(54) DISTANCE MEASURING APPARATUS

(75) Inventors: Masahiro Ohishi; Yoshikatsu Tokuda, both of Tokyo (JP)

(73) Assignee: Kabushiki Kaisha Topcon (JP)

( * ) Notice: Subject to any disclaimer, the term of this patent is extended or adjusted under 35 U.S.C. 154(b) by 0 days.

(21) Appl. No.: 09/574,489

(22) Filed: May 19, 2000

(30) Foreign Application Priority Data

May 21, 1999 (JP) .......................................... 11-142373

(51) Int. Cl.$^7$ ................................................ G01C 3/08
(52) U.S. Cl. .................................................... 356/5.13
(58) Field of Search ............................. 356/5.13, 5.12, 356/4.01

(56) References Cited

U.S. PATENT DOCUMENTS 3,619,058 A * 11/1971 Hewlett ...................... 356/5.12
5,760,905 A *  6/1998 Sasagawa ................... 356/4.01
5,991,011 A * 11/1999 Damm ....................... 356/5.13

* cited by examiner

Primary Examiner—Thomas H. Tarcza
Assistant Examiner—Fred H Mull
(74) Attorney, Agent, or Firm—Baker Botts LLP

(57) ABSTRACT

The present invention relates to a distance measuring apparatus having an attenuation filter for adjusting luminous energy of a luminous flux incident on light receiving converting means. An object of the present invention is to provide a distance measuring apparatus in which at least a part of the attenuation filter is arranged as deflection means. According to the arrangement of the distance measuring apparatus of the present invention, a light projecting system irradiates a measuring luminous flux toward an object under measurement, a light receiving system receives the reflected luminous flux reflected on the object under measurement and leading the reflected light to light receiving converting means, and a distance from a position at which measurement is carried out to a position at which the object under measurement is located, is measured based on the reflected luminous flux received by the light receiving converting means. An attenuation filter adjusts luminous energy of the luminous flux incident on the light receiving converting means, and at least a part of the attenuation filter is arranged as deflection means.

7 Claims, 8 Drawing Sheets

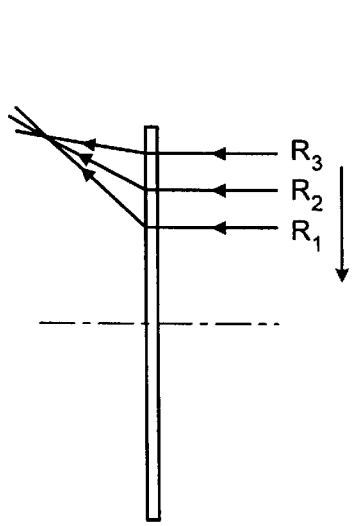
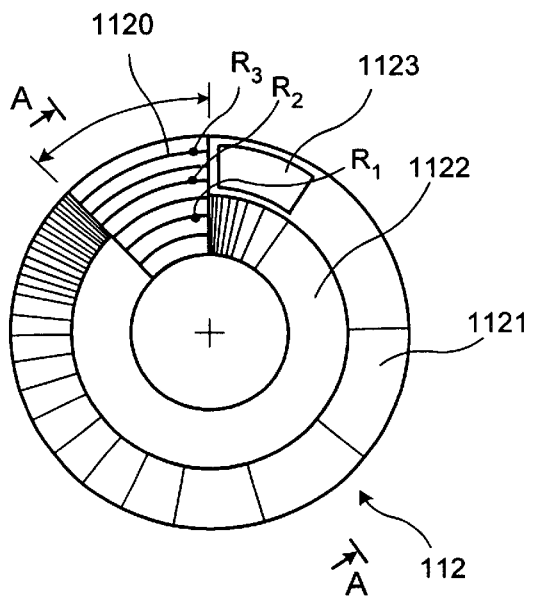
FIG. 4(b)        FIG. 4(a)
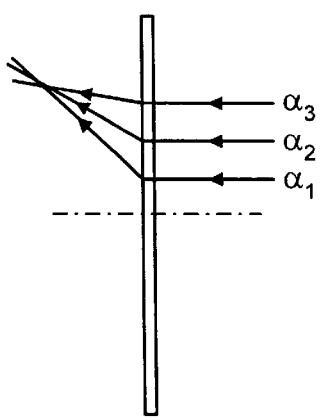
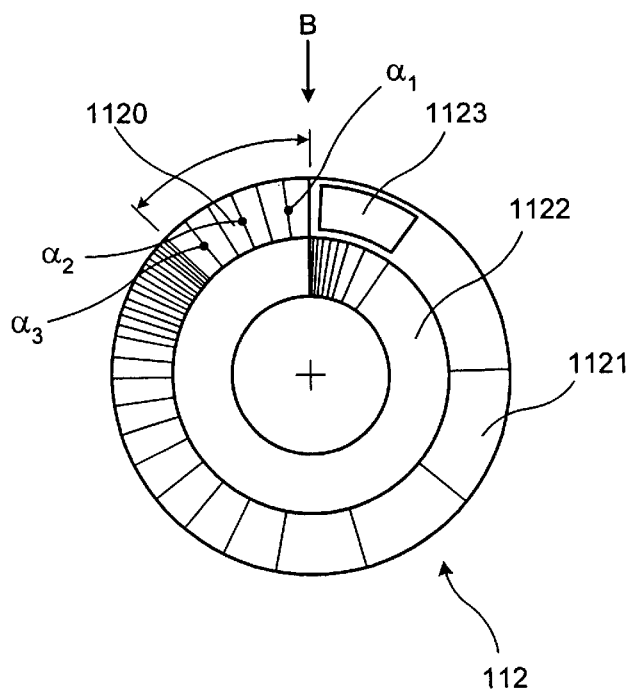
FIG. 5(b)        FIG. 5(a)

US 6,384,904 B1

DISTANCE MEASURING APPARATUS

BACKGROUND OF THE INVENTION

The present invention relates to a distance measuring apparatus having an attenuation filter for adjusting luminous energy of a luminous flux incident on light receiving converting means, and more particularly to a distance measuring apparatus in which at least a part of the attenuation filter is arranged as deflection means.

A distance measuring apparatus known to us is one such that visible light, non-visible light, modulated light or pulse light is projected as measuring light toward an object under measurement, and a reflected luminous flux reflected on the object under measurement is received, whereby a distance from a position at which measurement is carried out to a position at which the object under measurement is located, is measured.

In general, components of such a kind of distance measuring apparatus can be roughly classified into an optical section for irradiating and receiving measuring light and an electrical section for converting the received measuring light into an electrical signal to calculate the distance under measurement.

The optical section for irradiating and receiving measuring light is composed of a light emitting unit for emitting measuring light from a light source, a light irradiating system for irradiating the measuring light from the light emitting unit onto the object under measurement, a light receiving system for leading the reflected light from the object under measurement, and a light receiving unit for receiving reflected light led from the light receiving system.

FIG. 1 is a diagram schematically showing an optical system of the above-arranged distance measuring apparatus.

As shown in FIG. 1, in a general light wave distance measuring apparatus, a pulse luminous flux or modulated luminous flux generated from a light source 100 is projected through a rotative light shielding disk 102, a rectangular prism 104, an objective lens 106 toward an object 108 under measurement.

The rotative light shielding disk 102 alternately selects one of a reference luminous flux which is split by a half mirror 130 and a measuring luminous flux which has traveled the distance between the measuring position and the object under measurement, and then allows the selected one of the fluxes to become incident on a light receiving element 120. The rotative light shielding disk 102 is rotatively driven by a motor, shields the reference luminous flux and the measuring luminous flux selectively, and allows them to enter the light receiving element 120 alternately.

An internal luminous flux is utilized for correcting an internal error within the light wave distance measuring apparatus. The measuring luminous flux reflected on the object 108 under measurement or a reflection mirror 110 is led through the objective lens 106, the rectangular prism 104, a luminous energy attenuation filter 112 to the light receiving element 120. In order to make the apparatus free from influence of a light receiving characteristic caused by received luminous energy, the measuring luminous flux incident on the light receiving element 120 is subjected to a luminous energy adjustment effected by the luminous energy attenuation filter 112 so that the received luminous energy is kept constant.

The reference luminous flux split from the half mirror 130 is led through a mirror 132, the rotative light shielding disk 102, a pair of relay lenses 134 and 136, mirrors 138 and a half mirror 140 disposed between the luminous energy attenuation filter 112 and the light receiving element 120, into the light receiving element 120.

Any ordinary reflection mirror may be utilized as the reflection mirror 110. However, if a pulse luminous flux is utilized as the measuring luminous flux, the object 108 under measurement itself can serve as the reflection mirror. Alternatively, the reflection mirror 110 may be attached on the object 108 under measurement.

FIG. 9 is a diagram showing an arrangement of a conventional luminous energy attenuation filter. As shown in FIG. 9, the luminous energy attenuation filter 112 is composed of an outer toroidal portion and an inner toroidal portion. The outer toroidal portion is arranged as a measuring luminous flux attenuation filter 1121 while the inner toroidal portion is arranged as a reference luminous flux attenuation filter 1122. If a distance under measurement is long, the measuring luminous flux will suffer from attenuation. Thus, the outer toroidal portion has at a part itself a through-hole aperture 1123 having no filtering function, and hence the measuring luminous flux passing through the through-hole aperture 1123 can be protected from attenuation. When only a small luminous energy is obtained from the measuring luminous flux, intensive attenuation is effected on the reference luminous flux.

The luminous energy attenuation filter 112 is controlled as follows. FIG. 3 is a block diagram of the distance measuring apparatus. As shown in FIG. 3, a light receiving unit 154 composed of the light receiving element 120 and a light detecting unit 150 detects luminous energy of the measuring luminous flux which indicates the measuring luminous energy, and then supplies the detected result to a CPU 156. The CPU 156 calculates a luminous energy control signal based on the measuring luminous energy and supplies the same to a driving circuit unit 158.

The driving circuit unit 158 is arranged to drive and control a driving motor 164 of the luminous energy attenuation filter 112 on the basis of a supplied luminous energy control signal.

FIG. 7A is a diagram schematically illustrative of an optical path system arranged between the light emitting side and the light receiving side of the distance measuring apparatus. As shown in FIG. 7A, a measuring light beam generated from the light emitting unit having a light source 1 is directed to a reflection mirror 2 on which it is reflected and then led to an objective lens 3 which is included in an irradiation optical system. The measuring light beam which is made into a parallel luminous flux by the objective lens 3 is led to an object 4 under measurement. A light beam reflected on the object 4 under measurement is again directed to the objective lens 3. It should be noted that the object 4 under measurement is provided in the direction determined by the optical axis of the objective lens 3.

The object 4 under measurement may be a corner cube, i.e., a recurrent reflection prism provided on the object under measurement. The object 4 under measurement may also be a reflection sheet provided on the object under measurement or the object under measurement itself.

A reflected light beam directed to the objective lens 3 is concentrated by the objective lens 3, reflected on the reflection mirror 2 and focused on light receiving means 5 of the light receiving unit.

In a general measuring apparatus, if a single objective lens 3 is arranged (as a single lens type) to serve as an objective lens for the light irradiating system and an objective lens for the light receiving system, as for example shown in FIG. 7A, the objective lens may be divided into two portions, e.g., an upper portion and a lower portion, a right portion and a left portion, and a central portion and a peripheral portion, and either of them is arranged for the light irradiating system or the light receiving system. Further, known in a distance measuring apparatus in which the light irradiating system and the light receiving system have objective lenses independently (two lens type).

Incidentally, in the distance measuring apparatus arranged as described above, if the object 4 under measurement is a corner cube, as shown in FIG. 7A, the irradiation parallel light beam and the reflection parallel beam travel separate optical paths, respectively. Therefore, even if the light irradiating system including the light source 1 and the light receiving system including the light receiving sensor 5 are not positioned on the same optical axis, the distance between the measuring apparatus and the object under measurement can be detected regardless of the distance. In other words, the distance can be measured even if the distance under measurement is long or short.

On the other hand, as shown in FIG. 7B, if a reflection sheet (a sheet having minute glass balls or minute prisms which are recurrent property provided over the surface thereof) or a natural material (material having a reflective property to some extent) substantially serves as the object 6 under measurement, the measuring luminous flux irradiated onto the object 6 under measurement becomes scattered light beams with a irradiation position J1 being center of scattering.

If the distance between the distance measuring apparatus and the object under measurement is relatively long, incident on the light receiving system are reflected light beams substantially parallel to the optical axis of the objective lens 3 out of the scattered reflected light beams which derive from reflection of the measuring light beams. For this reason, even if the objective lens is divided into the portion for the light irradiating system and the portion for the light receiving system, the light receiving unit can receive a reflected light beam necessary for measuring the distance under measurement.

Conversely, if the distance between the distance measuring apparatus and the object under measurement is short, then reflected light beams reflected on the object under measurement and incident on the light receiving system tend to have a large tilting angle with respect to the optical axis of the objective lens. For this reason, it is hard to form an image on the light receiving sensor.

Accordingly, the reflected luminous flux reflected in the above described manner on the object 6 under measurement contains light beams incident on the objective lens 3 with a considerable angle with respect to the optical axis of the objective lens, with the result that an image is formed on a place deviated from the light receiving sensor 5. Thus, the luminous energy received by the light receiving sensor 5 becomes extremely small, which makes it very difficult to measure the distance.

However, a measuring method in which the above-mentioned reflection sheet or a natural material is utilized as the object 6 under measurement, is desired in view of an aspect that the above-described optical distance measuring apparatus using a laser light beam as the measuring luminous flux can measure a distance whatever the object under measurement is.

FIGS. 8A and 8B are diagrams illustrative of a counter-measure against the above mentioned problems which are requested to solve when measurement is carried out on the reflection sheet or a natural material as an object 6 under measurement which is remote from the measuring apparatus by a short distance. That is, a prism 7 shown in FIG. 8A or a lens 8 shown in FIG. 8B for correction was provided in the optical path between the objective lens 3 and the object 6 under measurement, whereby a part of the reflected luminous flux scattered by the object 6 under measurement was made to contribute to the formation of the image on the light receiving element 5.

However, if the prism 7 or the lens 8 is assembled into the distance measuring apparatus, it is requested that when the distance measuring apparatus is utilized for measuring a long distance, the prism 7 or the lens 8 shall be removed from the optical path while when the distance measuring apparatus is utilized for measuring a short distance, the prism 7 or the lens 8 shall be inserted into the optical path. Therefore, the prism 7 or the lens 8 leads to a remarkable increase in cost as a separate part for correction. In addition, the main body of the apparatus will become large in size or heavy in weight.

Further, if the prism 7 or the lens 8 is assembled into the distance measuring apparatus, an operator of the distance measuring apparatus is requested to carry out the removing and inserting operation of the prism 7 or the lens 8, in addition to the measuring operation. Furthermore, an erroneous operation can happen due to cumbersome operation such that distance measurement is carried out with the prism 7 or the lens 8 inserted in spite of the fact that the corner cube 4 is utilized as an object 6 under measurement. Alternatively, distance measurement is carried out with the prism 7 or the lens 8 removed in spite of the fact that the reflection sheet or the natural material is utilized as an object 6 under measurement.

In view of the above aspect, an object of the present invention is to provide a distance measuring apparatus in which, though it is possible to measure the relatively short distance between the apparatus and an object under measurement in the case where the object under measurement is a reflective sheet or a natural material, a cost for a separate part for correction can be decreased, the apparatus can be designed to be small in size and light in weight, and moreover operability of the apparatus can be improved.

SUMMARY OF THE INVENTION

According to the present invention, there is provided a distance measuring apparatus including a light projecting system for irradiating a measuring luminous flux toward an object under measurement and a light receiving system for receiving a reflected luminous flux reflected on the object under measurement and leading the reflected light to light receiving converting means, whereby a distance from a position at which measurement is carried out to a position at which the object under measurement is located, is measured based on the reflected luminous flux received by the light receiving means, wherein an attenuation filter adjusts luminous energy of the luminous flux incident on the light receiving converting means, and at least a part of the attenuation filter is arranged as deflection means.

BRIEF DESCRIPTION OF THE DRAWINGS

FIG. 4A is a diagram illustrative of another example of a luminous energy attenuation filter 112 according to the present invention;

FIG. 4B is a diagram for explaining the example of the luminous energy attenuation filter 112 shown in FIG. 4A;

FIG. 5A is a diagram illustrative of still another example of a luminous energy attenuation filter according to the present invention;

FIG. 5B is a diagram for explaining the example of the luminous energy attenuation filter shown in FIG. 5A;

DESCRIPTION OF PREFERRED EMBODIMENTS

Embodiments of the present invention will hereinafter be described with reference to the drawings.

Figure 1:
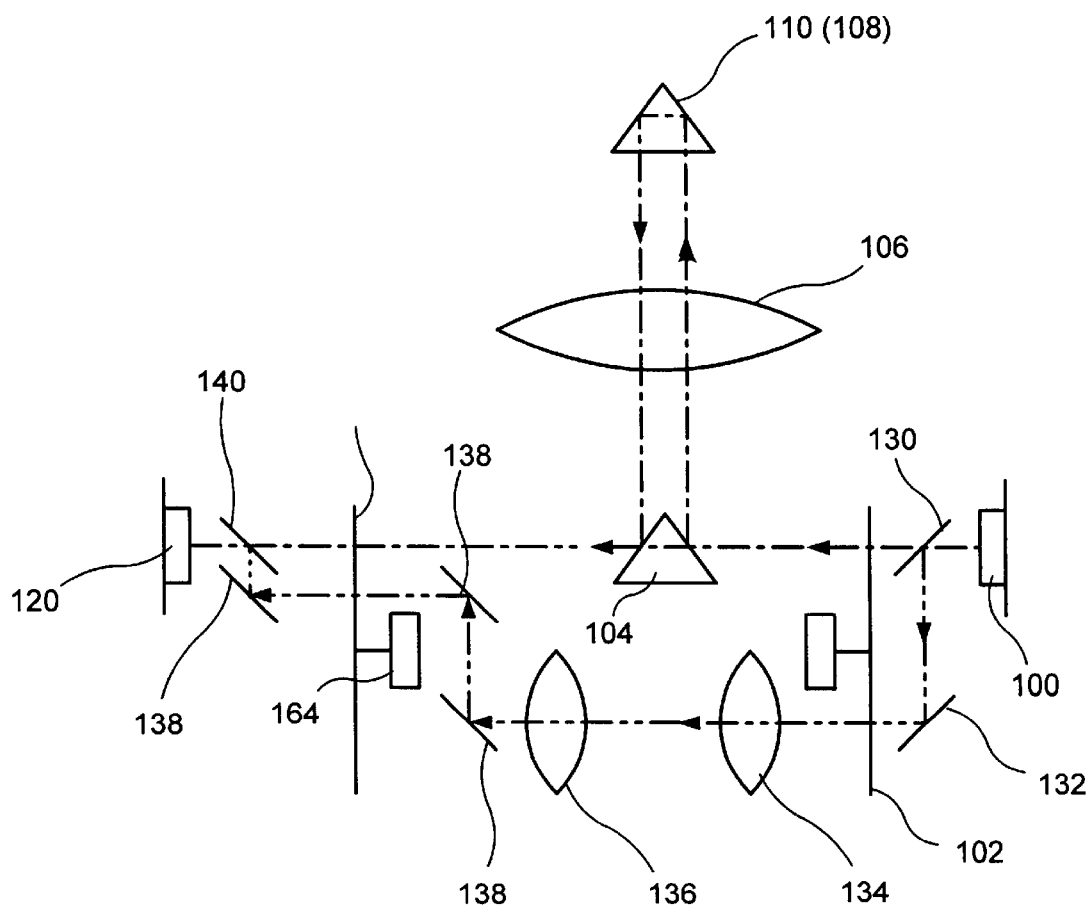
FIG. 1 is a diagram showing an optical arrangement of an optical distance measuring apparatus 1000 to which the present invention can be applied.

As shown in FIG. 1, in an optical distance measuring apparatus 1000 as an embodiment of the present invention, a measuring luminous flux such as a pulse luminous flux or a modulated luminous flux emitted from a light source 100 is projected through the rotative light shielding disk 102, the rectangular prism 104 and the objective lens 106 toward the object 108 under measurement. An optical path included in the above optical system corresponds to a light projecting system and the object 108 under measurement corresponds to a target of measurement.

Measurement can be carried out by providing the reflection mirror 110 on the object 108 under measurement.

The rotative light shielding disk 102 is utilized for allowing the reference luminous flux and the measuring luminous flux split from each other by the half mirror 130 to alternately pass through the disk and become incident on the light receiving element 120. The rotative light shielding disk 102 is driven by a motor, providing shielding selectively on the reference luminous flux and the measuring flux, and allowing them alternately to become incident on the light receiving element 120. An optical path extending from the object 108 under measurement to the light receiving element 120 which receives the reflected luminous flux reflected on the object 108 under measurement, corresponds to the light receiving system. The light receiving element 120 corresponds to the light receiving converting means.

An internal luminous flux, which travels a light path within the distance measuring apparatus, is utilized for correcting an internal error of the light wave distance measuring apparatus.

The measuring luminous flux reflected on the object 108 under measurement or the reflecting mirror 110 is led through the rectangular prism 104, the objective lens 106 and the luminous energy attenuation filter 112 to the light receiving element 120. In order to make the light receiving element 120 free from influence of the light receiving characteristic caused by the received luminous energy, the measuring luminous flux incident on the light receiving element 120 is subjected to a luminous energy adjustment effected by the luminous energy attenuation filter 112 so that the amount of luminous energy received by the light receiving element 120 is maintained constant.

The reference luminous flux split from the half mirror 130 is led through a mirror 132, the rotative light shielding disk 102, a pair of relay lenses 134 and 136, a mirror 138 and a half mirror 140 disposed between the luminous energy attenuation filter 112 and the light receiving element 120, into the light receiving element 120.

Figure 2:
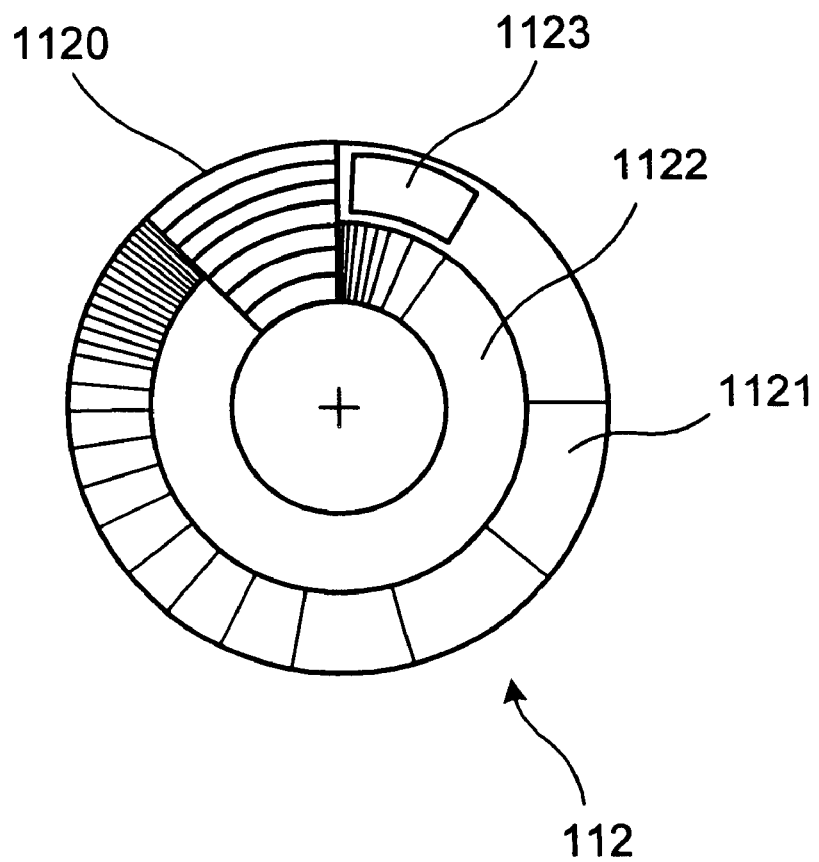
FIG. 2 is a diagram illustrative of an example of a luminous energy attenuation filter 112 according to the present invention.

FIG. 2 is a diagram showing an arrangement of a luminous energy attenuation filter 112 according to the present invention. As shown in FIG. 2, the luminous energy attenuation filter 112 is composed of a fresnel portion 1120, an outer toroidal portion and an inner toroidal portion. The outer toroidal portion is arranged as the measuring luminous flux attenuation filter 1121 while the inner toroidal portion is arranged as the reference luminous flux attenuation filter 1122. If a distance under measurement is long, the measuring luminous flux will suffer from attenuation. Thus, the outer toroidal portion has at a part itself the through-hole aperture 1123 having no filtering function, and hence the measuring luminous flux passing through the through-hole aperture 1123 can be protected from attenuation. When only a small luminous energy is obtained from the measuring luminous flux, intensive attenuation is effected on the reference luminous flux. The luminous energy attenuation filter 112 corresponds to the attenuation filter.

Figure 3:
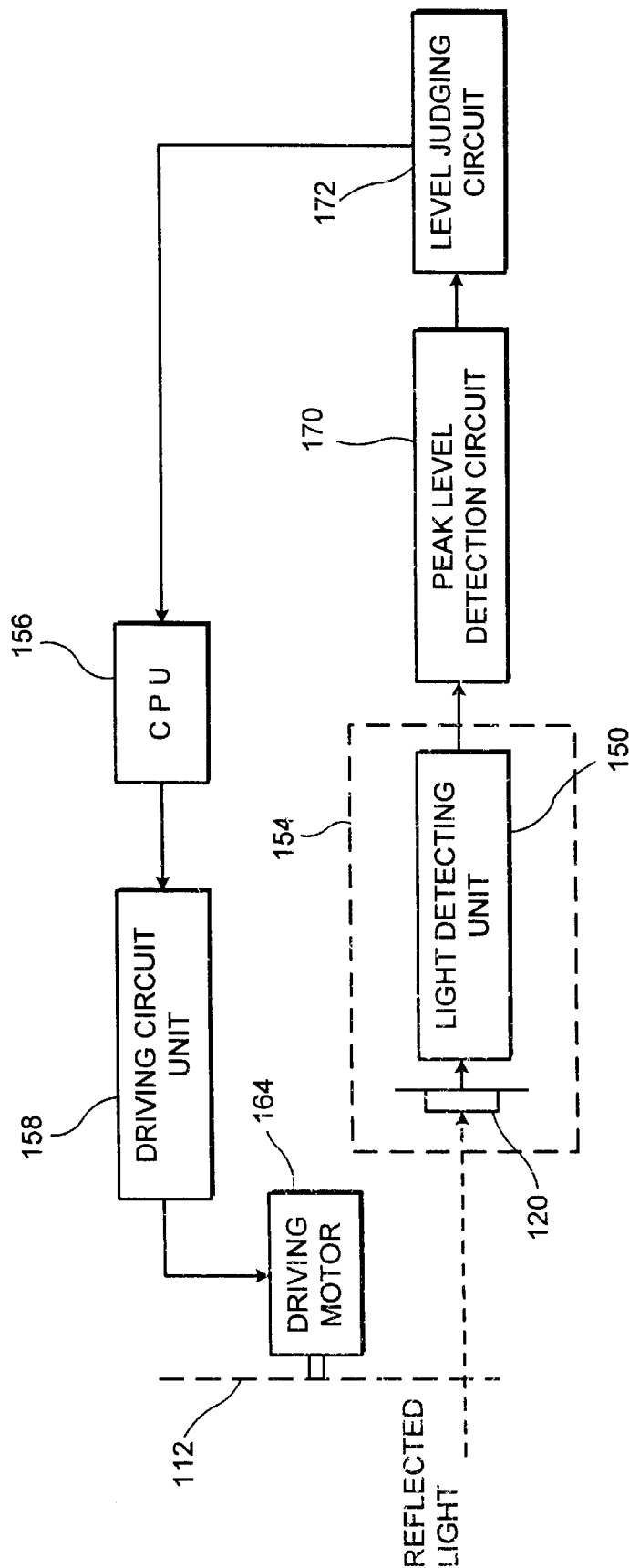
FIG. 3 is a diagram showing an electrical arrangement of the optical distance measuring apparatus 1000 to which the present invention can be applied.

The luminous energy attenuation filter 112 is controlled as follows. FIG. 3 is a block diagram of the distance measuring apparatus. As shown in FIG. 3, a light receiving unit 154 composed of the light receiving element 120 and a light detecting unit 150 detects luminous energy of the measuring luminous flux which indicates the measuring luminous energy, and then supplies the detected result to the CPU 156. The CPU 156 calculates a luminous energy control signal based on the measuring luminous energy and supplies the same to the driving circuit unit 158.

When the light receiving element 154 generates no detecting signal, it is expected that the distance under measurement exceeds a range which the measuring apparatus can detect, or alternatively the distance under measurement is short with the result that the measuring luminous flux that should become incident on the light receiving element is actually deviated from the light receiving element. Therefore, the CPU 156 controls the luminous energy attenuation filter 112 by means of the driving unit 158 such that the luminous attenuation filter 112 allows the measuring luminous flux to pass through the filter at the fresnel portion 1120. If a detecting signal is still not detected, the distance measuring apparatus provides a display indicative of that the measuring is impossible.

The driving circuit unit 158 is arranged to drive and control a driving motor 164 of the luminous energy attenuation filter 112 on the basis of a supplied luminous energy control signal.

Now the luminous energy attenuation filter 112 will hereinafter be described in detail.

As shown in FIG. 2, the luminous energy attenuation filter 112 includes the fresnel portion 1120 and the measuring luminous flux attenuation filter 1121 formed in the outer toroidal portion except for the fresnel portion 1120. Further, the luminous energy attenuation filter 112 includes the reference luminous flux attenuation filter 1122 formed on the inner toroidal portion except for the fresnel portion 1120.

The outer toroidal portion is arranged to have the through-hole aperture 1123 which allows the measuring luminous flux having traveled a long distance to pass through the aperture without attenuation. The arrangement of the measuring luminous flux attenuation filter 1121 and the reference luminous flux attenuation filter 1122 is made such that if an amount of measuring luminous flux is small, the corresponding reference luminous flux is attenuated.

The fresnel portion corresponds to the deflection means. As shown in FIG. 4A, the fresnel portion 1120 is arranged such that the fresnel portion provides deflection which becomes larger as a position comes close to the center of the attenuation filter. If the attenuation filter is inversely arranged, the fresnel portion may be arranged such that the fresnel portion provides deflection which becomes smaller as the position comes close to the center of the attenuation filter. Furthermore, the fresnel portion may be arranged such that the fresnel portion provides deflection which becomes larger depending on the angular position measured in the circumference directions.

As is illustrated in the cross-sectional profile of deflection shown in FIG. 4B, the measuring luminous flux contains a light beam greatly deflected at the center portion thereof, and hence the incident light beam forms an image in more deviated fashion if the distance under measurement is short. Therefore, the fresnel portion of the attenuation filter is arranged as described above.

In addition to the above arrangement in which the deflection becomes large as the position comes close to the center of the attenuation filter, the fresnel portion is arranged such that the fresnel portion provides deflection which becomes larger depending on the angular position measured in the circumference direction. Therefore, it becomes possible to adjust the amount of luminous energy incident on the light receiving element 120 by changing the angular position of the fresnel position through which the measuring luminous flux passes.

Further, as show in FIG. 5A, the fresnel portion 1120 may be arranged such that the fresnel 1120 provides deflection which becomes larger depending on the angular position measured in either of the circumference of the attenuation filter 112.

In this case, as shown in FIG. 5B, light beams of the measuring luminous flux are deflected more as the point through which the beam passes comes close to point B in FIG. 5B. Accordingly, it becomes possible to adjust the amount of luminous energy incident on the light receiving element 120 by changing the angular position of the fresnel position through which the measuring luminous flux passes.

Figure 6:
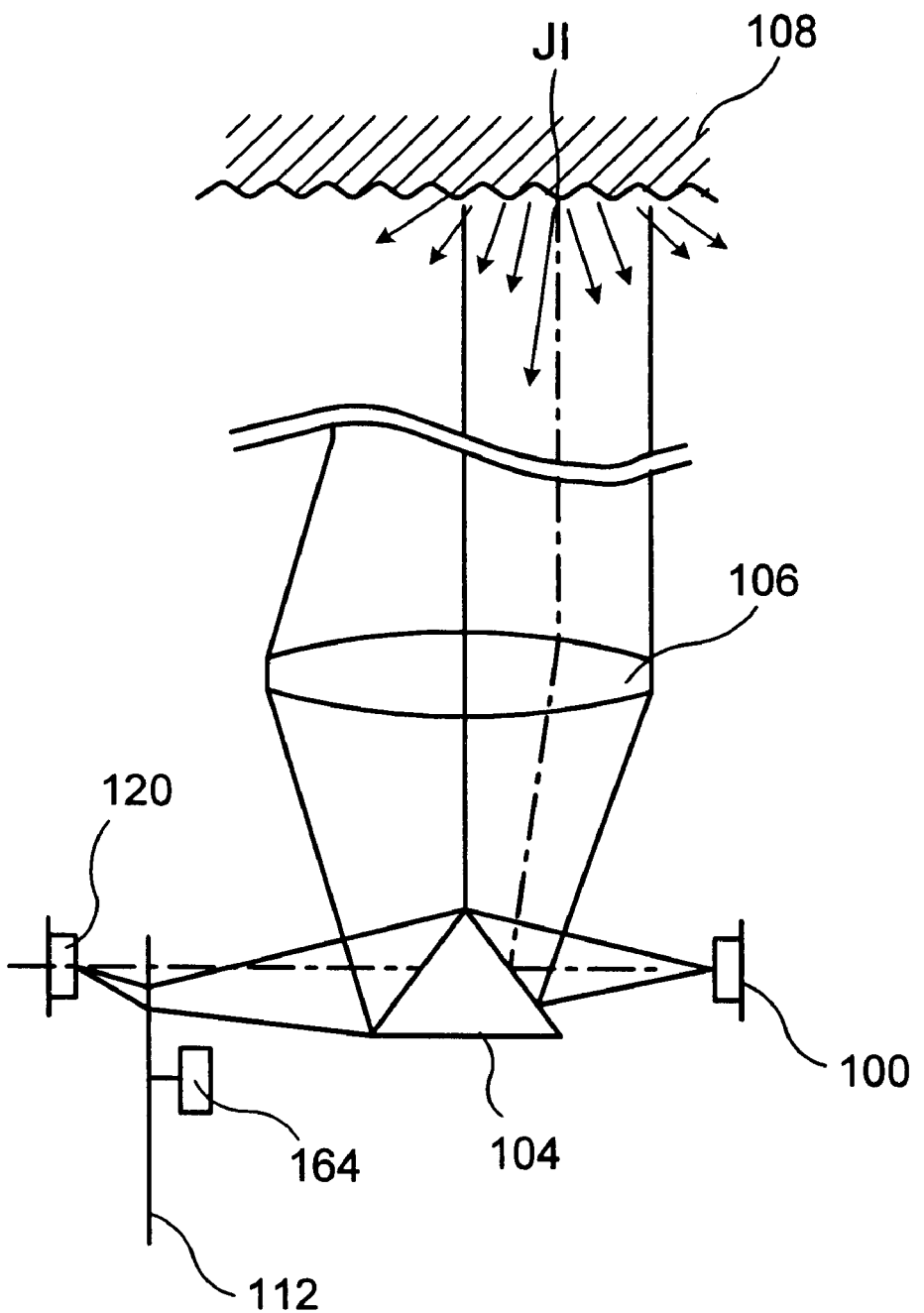
FIG. 6 is a diagram useful for explaining the effect of the luminous energy attenuation filter according to the present invention.
Figure 7A:
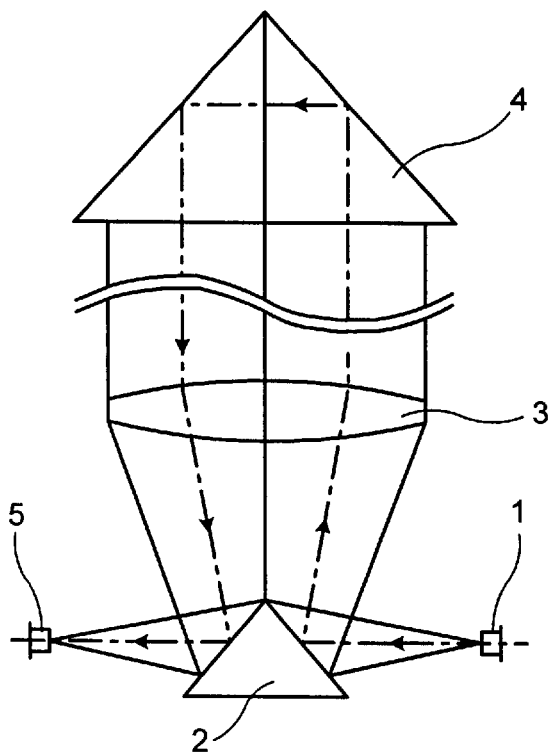
FIGS. 7A and 7B are each diagram for explaining a conventional technology.
Figure 7B:
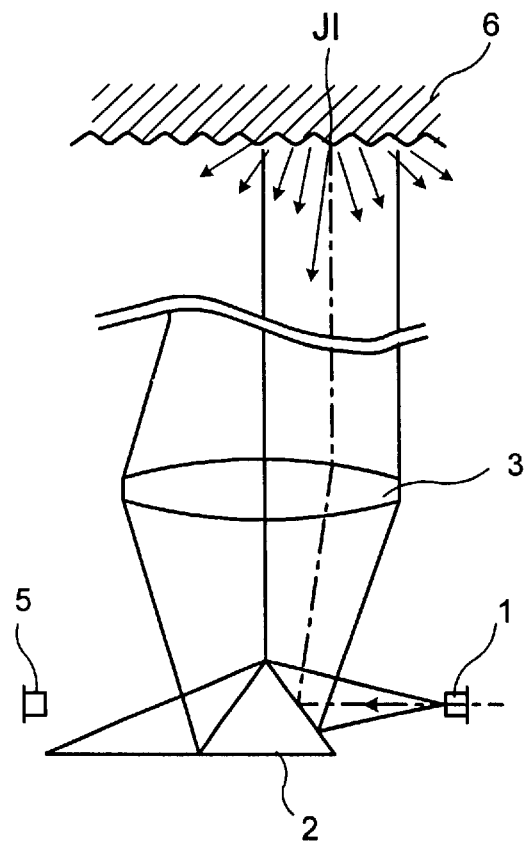
Figure 8A:
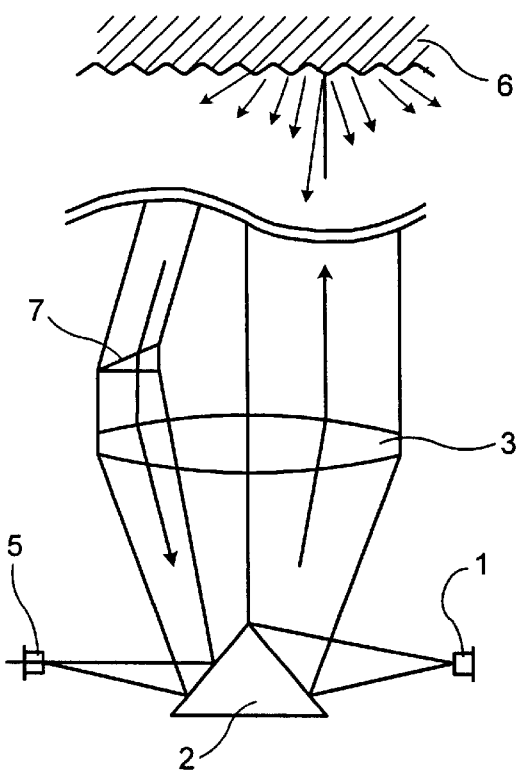
FIGS. 8A and 8B are each diagram for explaining a conventional technology.
Figure 8B:
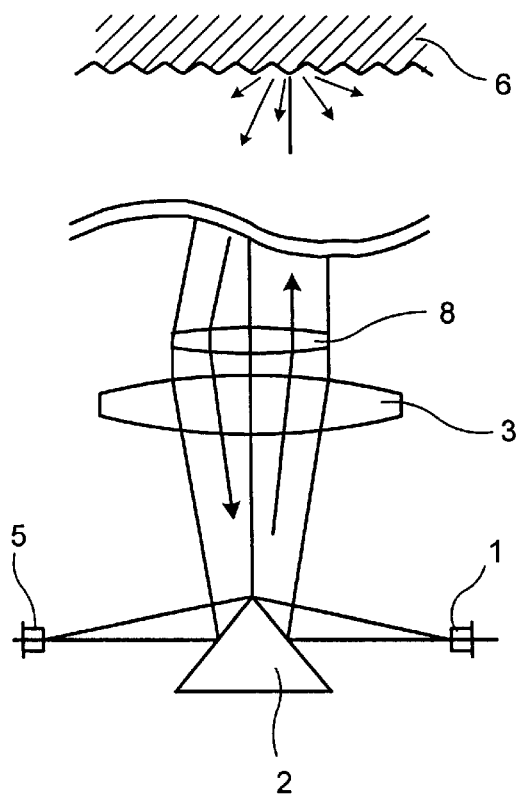
Figure 9:
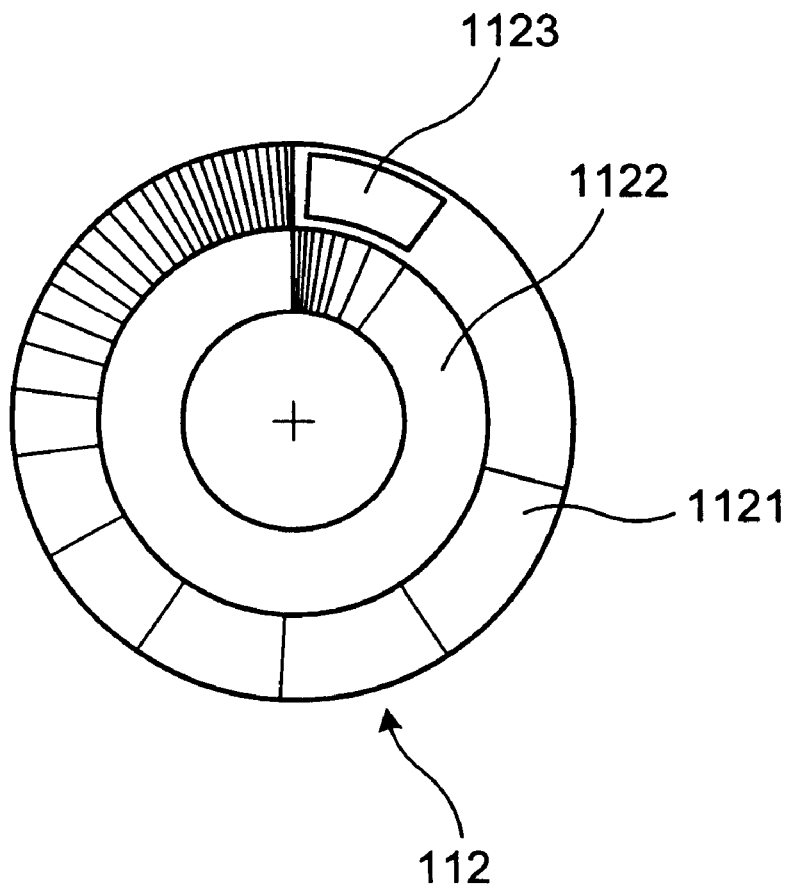
FIG. 9 is a diagram showing a conventional luminous energy attenuation filter.

According to the luminous energy attenuation filter 112 arranged as described above, as shown in FIG. 6, if the distance under measurement is short, the measuring luminous flux can be deflected by the fresnel portion 1120 so that the measuring luminous flux can be led to the light receiving element 120.

The distance measuring apparatus according to the present invention has substantially the same arrangement except for the part of the luminous energy attenuation filter 112. Therefore, the arrangement of the distance measuring apparatus other than the part of the luminous energy attenuation filter will not be described.

While in the above-described embodiment of the present invention the deflection means is arranged as a fresnel portion, the deflection means may be composed of any suitable diffraction means.

According to the arrangement of the distance measuring apparatus of the present invention described above, the light projecting system irradiates the measuring luminous flux toward an object under measurement, the light receiving system receives the reflected luminous flux reflected on the object under measurement and leading the reflected light to light receiving converting means, and a distance from a position at which measurement is carried out to a position at which the object under measurement is located, is measured based on the reflected luminous flux received by the light receiving converting means. The attenuation filter adjusts luminous energy of the luminous flux incident on the light receiving converting means, and at least a part of the attenuation filter is arranged as deflection means. According to the above arrangement, even if the distance under measurement is short, the luminous flux can be deflected by the deflection means so that the luminous flux becomes incident on the light receiving converting means.

What is claimed is:

1. A distance measuring apparatus comprising a light projecting system for irradiating a measuring luminous flux toward an object under measurement and a light receiving system for receiving a reflected luminous flux reflected on the object under measurement and leading the reflected light to light receiving converting means, whereby a distance from a position at which measurement is carried out to a position at which the object under measurement is located, is measured based on the reflected luminous flux received by the light receiving converting means, wherein the distance measuring apparatus further comprises an attenuation filter for adjusting luminous energy of the luminous flux incident on the light receiving converting means, and at least a part of the attenuation filter is arranged as deflection means.

2. A distance measuring apparatus according to claim 1, wherein the deflection means deflects the luminous flux toward the light receiving converting means.

3. A distance measuring apparatus according to claim 1 or 2, wherein the deflection means is a Fresnel lens.

4. A distance measuring apparatus according to claim 1 or 2, wherein the deflection means is composed of diffraction means.

5. A distance measuring apparatus according to claim 1, wherein the deflection means provides deflection which becomes larger depending on the angular position measured in either of the circumference directions.

6. A distance measuring apparatus according to claim 1, wherein the deflection means provides deflection which becomes larger depending on the distance from the center of the attenuation filter to a position.

7. A distance measuring apparatus according to claim 6, wherein the deflection means provides deflection which becomes larger depending on the angular position measured in either of the circumference directions, and luminous energy received by the light receiving means is made adjustable by selecting the degree of deflection variable depending on the angular position.

\* \* \* \* \*